United States Patent
Stork et al.

(10) Patent No.: US 7,120,699 B2
(45) Date of Patent: Oct. 10, 2006

(54) DOCUMENT CONTROLLED WORKFLOW SYSTEMS AND METHODS

(75) Inventors: David G. Stork, Portola Valley, CA (US); Robert van Glabbeek, Portola Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 866 days.

(21) Appl. No.: 09/958,000

(22) Filed: Sep. 20, 2001

(65) Prior Publication Data
US 2003/0055811 A1    Mar. 20, 2003

(51) Int. Cl.
G06F 15/173    (2006.01)
G06F 9/44    (2006.01)

(52) U.S. Cl. ...................... 709/239; 717/104
(58) Field of Classification Search ............... 709/239; 717/104
See application file for complete search history.

(56) References Cited

U.S. PATENT DOCUMENTS

| | | | |
|---|---|---|---|
| 4,068,214 A | | 1/1978 | Patil |
| RE31,287 E | | 6/1983 | Patil |
| 4,644,461 A | | 2/1987 | Jennings |
| 4,700,187 A | | 10/1987 | Furtek |
| 4,866,605 A | | 9/1989 | Nakano et al. |
| 5,029,080 A | | 7/1991 | Otsuki |
| 5,181,162 A | * | 1/1993 | Smith et al. ............. 707/104.1 |
| 5,257,363 A | * | 10/1993 | Shapiro et al. ............... 703/13 |
| 5,283,896 A | * | 2/1994 | Temmyo et al. ............ 718/104 |
| 5,291,427 A | | 3/1994 | Loyer et al. |
| 5,481,668 A | * | 1/1996 | Marcus ........................ 715/853 |
| 5,515,490 A | * | 5/1996 | Buchanan et al. ........ 715/500.1 |
| 5,524,241 A | * | 6/1996 | Ghoneimy et al. ........... 707/10 |
| 5,548,506 A | * | 8/1996 | Srinivasan .................. 709/206 |
| 5,555,179 A | * | 9/1996 | Koyama et al. ............... 700/95 |
| 5,581,691 A | * | 12/1996 | Hsu et al. ...................... 714/15 |
| 5,721,959 A | * | 2/1998 | Nakamura et al. .......... 715/723 |
| 5,742,283 A | | 4/1998 | Kim |
| 5,774,661 A | * | 6/1998 | Chatterjee et al. .......... 709/203 |
| 5,826,020 A | * | 10/1998 | Randell ...................... 709/226 |
| 5,890,130 A | * | 3/1999 | Cox et al. ....................... 705/7 |
| 5,893,074 A | * | 4/1999 | Hughes et al. ................. 705/8 |
| 5,974,392 A | * | 10/1999 | Endo ............................. 705/8 |

(Continued)

FOREIGN PATENT DOCUMENTS

DE    4301391 A1    8/1994

(Continued)

OTHER PUBLICATIONS

Aceto, L., and Hennessy, M., "Adding Action Refinement to a Finite Process Algebra*," Information and Computation, 115, pp. 179-247 (1994).

(Continued)

*Primary Examiner*—Jason Cardone
*Assistant Examiner*—Ajay Bhatia
(74) *Attorney, Agent, or Firm*—Townsend and Townsend and Crew LLP

(57) ABSTRACT

The document controlled workflow techniques are provided that can be represented by refinable Petri nets. A document may contain a control code that indicates to the document controlled workflow system to implement specified operations (i.e., functions) at a refinable place. The operations implemented at the refinable place are determined by the control code in the document. An author of the document can customize a document controlled workflow system of the present invention by entering a control code into a document that triggers the implementation of operations customized to that particular document at a refinable place in the document workflow system. The operations specified by a control code in a document can be represented by a refinement network.

26 Claims, 3 Drawing Sheets

U.S. PATENT DOCUMENTS

| | | | | |
|---|---|---|---|---|
| 5,983,016 | A | * | 11/1999 | Brodsky et al. ............ 717/104 |
| 5,999,911 | A | * | 12/1999 | Berg et al. ...................... 705/9 |
| 6,002,850 | A | * | 12/1999 | Sumino et al. ............. 719/315 |
| 6,011,830 | A | | 1/2000 | Sasin et al. |
| 6,038,541 | A | * | 3/2000 | Tokuda et al. .............. 709/206 |
| 6,067,357 | A | * | 5/2000 | Kishinsky et al. ..... 379/265.02 |
| 6,178,239 | B1 | | 1/2001 | Kishinsky et al. |
| 6,225,998 | B1 | * | 5/2001 | Okita et al. ................. 715/853 |
| 6,256,598 | B1 | | 7/2001 | Park et al. |
| 6,725,428 | B1 | * | 4/2004 | Pareschi et al. ............ 715/530 |
| 2002/0059089 | A1 | * | 5/2002 | Suzuki et al. .................. 705/8 |
| 2003/0144974 | A1 | * | 7/2003 | Chang et al. ................. 706/25 |
| 2004/0093585 | A1 | * | 5/2004 | Christodoulou et al ..... 717/104 |

FOREIGN PATENT DOCUMENTS

| | | |
|---|---|---|
| DE | 19621062 A1 | 11/1997 |
| JP | 7160773 A | 6/1995 |
| JP | 10049206 A | 2/1998 |
| JP | 10058288 A | 3/1998 |
| JP | 10124110 A | 5/1998 |
| JP | 10240714 A | 9/1998 |
| JP | 11328259 A | 11/1999 |

OTHER PUBLICATIONS

Anonymous, "Petri net approach to checking software structural change correctness in operation—using changed region analysis to identify parts still needing further checking using set of linear expressions in logic relationship," RD 348009 A, p. 225, (Apr. 10, 1993).

Bai, Yue-Bin, Liu, Yi, Ma, Jian-She, and Zheng, Shou-Qi, "Research and implementation of Distributed Security Administration System for Remote Access Based on NAS," Mini-Micro Systems, vol. 21, No. 11, pp. 1197-2000 (Nov. 2000) English abstract only.

Bauderon, M. and Courcelle, B. "Graph Expressions and Graph Rewriting," Mathematical Systems Theory, vol. 20, pp. 83-127, (1987).

Chun, Yang, "Application and Research of a User Name and Password Authentication Based on SOCKS V5," Journal of University of Electronic Science and Technology of China, vol. 30, No. 2, pp. 162-165 (Apr. 2001) English abtract only.

Doyle, E.M., Taveres, S.E., and Meijer, H., "Computer Analysis of Cryptographic Protocols Using Colored Petri Nets," 18th Bienniel Symposium on Communication Symposium Proceedings, pp. 194-199 (Jun. 1996).

El-Hadidi, M.T., Hebazi, N.H., and Aslan, H.K., "Implementation of a Hybrid Encryption Scheme for Ethernet," Proceedings of IEEE Symposium on Computers and Communications, Alexandria, Egypt, pp. 150-156 (Jun. 1995).

Genrich, H.J., and Lautenbach, K., "System Modelling With High-Level Petri Nets," Theoretical Computer Science, 13, pp. 109-136, (1981).

Juszczyszyn, K., "Secure Information Flow Model for Corporate Network," Information Systems Architecture and Technology ISAT 2000, pp. 272-279, (2000).

Karri, R., "A Security Imbedded Authentication Protocol," IEEE INFOCOM '88—The Conference on Computer Communications Proceedings, pp. 1105-1109 (Mar. 1988).

Kramer, B., "Rule-Enhanced Petri Nets for Software Process Modeling," SEKE ' 94—The 6th International Conference on Software Engineering and Knowledge Engineering, pp. 493-500 (Jun. 1994).

Milner, R., "Communicating and Mobile Systems: The $\pi$—Calculus," Cambridge University Press, Cambridge, UK, pp. 1-161, (1999).

Mirsky, E., and Dehon, A., "Matrix: A Reconfigurable Computing Architecture with Configurable Instruction Distribution and Deployable Resources," Proceedings of IEEE Workship of FPGAs for Custom Computing Machines, pp. 157-166, (1996).

Murata, T., "Petri nets: Properties, Analysis and Applications," Proceedings of the IEEE, vol. 77, No. 4, pp. 541-580, (Apr. 1989).

Morton, C.M., Robart, L.C., and Tavares, S.E., "Decomposition Techniques for Cryptographic Protocol Analysis," 1994 Canadian Conference on Electrical and Computer Engineering, pp. 335-339, (Sep. 1994).

Ohta, A., Ohba, T., and Hisamura, T., "On Liveness of Subclasses of Petri Nets with Permission or Inhibitor Arcs," Trans. of the Society of Instrument and Control Engineers, vol. 31, No. 10, pp. 1722-1729 (1995).

Schmidt, H.W., "Prototyping and Analysis of Non-Sequential Systems Using Predicate-Event Nets," Journal Systems Software, vol. 15, pp. 43-62, (1991).

Valette, R., "Analysis of Petri Nets By Stepwise Refinements," Journal of Computer and System Sciences, vol. 18, No. 1, pp. 35-46, (1979).

Van Der Aalst, Wil M.P., "Interorganizational Workflows: An approach based on message sequence charts and Petri Nets," website address: http://tmitwww.tm.tue.nl/staff/wvdaalst/Publications/p70.pdf, from In Proceedings of PROLAMAT'98, IFIP Transactions, Trento, pp. 1-43, (1998).

Van Der Aalst, Wil M.P., "Interorganizational Workflows: An approach based on message sequence charts and Petri Nets," Systems Analysis—Modelling—Stimulation (SAMS), vol. 34, pp. 335-367, (1999).

Van Der Aalst, Wil M.P., Woflan: a Petri-Net-Based Workflow Analyzer, vol. 35, No. 3, pp. 345-357, (1999).

Van Der Aalst, Wil M.P., "Three Good Reasons for Using a Petri-Net-Based Workflow Management System," Information and Process Integration in Enterprises: Rethinking Documents, Kluwer Academic Publishers, Norwell, MA, pp. 161-182 (1998).

Van Glabbeek, R., and Goltz, U., "Refinement of Actions in Causality Based Models," Proceedings of the Rex Workshop—Stepwise Refinement of Distributed System Models, Formalisms, Correctness, Mook, The Netherlands, pp. 267-300, (May 29-Jun. 2, 1989).

Van Glabbeek, and R., Weijland, P., "Branching Time and Abstraction in Bisimulation Semantics," Journal of the ACM, vol. 43, No. 3, pp. 555-600 (May 1996).

Weitz, W., "SGML Nets: Integrating Document and Workflow Modeling," Proceedings of the 31st Annual Hawaii International Conference on System Sciences, IEEE, pp. 185-194 (1998).

Brauer et al., "Survey of Behaviour and Equivalence Preserving Refinement of Petri Nets," Grzegorz Rozenberg, eds., in Advances in Petri Nets 1990, No. 483, in Lecture Notes in Computer Science (LNCS), pp. 1-46.

Genrich et al., "Predicate / Transition Nets," from *Lecture Notes in Computer Science*, Goos and Hartmanis eds., vol. 254, Petri Nets: Central Models and Their Properties, Brauer et al., eds., pp. 208-247, Springer-Verlag (1987).

Kohler et al., "Modeling the Structure and Behaviour of Petri Net Agents," from *Lecture Notes in Computer Science*, vol. 2075, pp. 224-241 (2001), Colom & Koutny eds., Springer-Verlag (2001).

Smith, E., "Principles of High-Level Net Theory," from *Lecture Notes in Computer Science*, vol. 1491, pp. 174-210 (1998), Reising & Rozenberg Eds., Springer-Verlag (1998).

Valk, R., "Petri Nets as Token Objects, An Introduction to Elementary Object Nets," from *Lecture Notes in Computer Science*, vol. 1420, pp. 1-25, Springer-Verlag (1989).

Kohler et al., "Liveness preserving composition of agent Petri nets," Technical Report, Universitat Hamburg, Fachbereich Informatik (2001).

Agenda for Meeting on XML/SGML based Interchange Formats for Petri Nets, 21st International Conference on Application and Theory of Petri Nets, held Jun. 26-30, 2000 in Aarhus Denmark, 2 pages.

Best, E., "Programming Environment based on Petri nets, Documentation and User Guide Version 1.4," published Nov. 1995 by Universitat Hildesheim Institut fur Informatik.

Kummer et al., "Following the Forces," Meeting on XML/SGML based Interchange Formats for Petri Nets, pp. 1-20, Jun. 28, 2000.

Webber, M., "The Petri Net Markup Language," cover page and pp. 1-15, Jun. 27, 2000.

\* cited by examiner

DOCUMENT CONTROLLED WORKFLOW SYSTEMS AND METHODS

BACKGROUND OF THE INVENTION

The present invention relates to the application of Petri nets to document workflow systems and methods, and more particularly, to active document controlled refinement workflow systems and methods.

A Petri net is a computer science structure that defines a concurrent process. Petri nets may be depicted graphically. In a Petri net, operations are represented by transitions (boxes), and states are represented as places (circles). The causal flow of a token through a Petri net is depicted by arcs linking transitions to states and states to transitions. The status of a state is indicated by the presence or absence of a token at that state.

A document workflow system is a pre-defined set of operations performed on document. A Petri net may be used to represent a document workflow system. In a Petri net representation of a document workflow system, a token passing through the Petri net represents a document. Petri nets provide a unifying formal language for document workflow systems. Typically, in document workflow systems, operations are performed on documents. For example, a document can be encrypted, translated, or photocopied. In a Petri net representation of a document workflow system, operations are represented by transitions.

In traditional document workflow systems, the designer of the document workflow retains absolute control over the workflow process by creating a set of operations that can be performed on a document. In a Petri net representation of a such a traditional document workflow system, the states and transitions in the Petri net are connected together in a fixed way that is predefined by the document workflow designer. Thus, each state and transition in the Petri net representation is pre-defined by design and cannot be changed without redesigning the document workflow system.

It may be desirable to modify the set of operations performed on a particular document in a document workflow system. In a Petri net representation of a prior art document workflow system, a workflow designer can modify a target Petri net by inserting a refinement network into the target Petri net.

The workflow designer specifies the target Petri network. A designer also specifies a refinement network. In prior art systems, the only way to modify the target network is for a workflow system designer to replace part of the target net with a refinement network that is specified by the workflow system designer. Thus, if one desires to perform different operations on each document, the workflow designer has to alter or refine the document workflow explicitly each time for each document.

BRIEF SUMMARY OF THE INVENTION

The present invention provides document controlled workflow techniques. In a document controlled workflow system of the present invention, a control code in a document triggers one or more operations (i.e., functions) at a refinable place in an existing document workflow system. An author of a document can customize a document controlled workflow system by entering a control code into the document that triggers operations at a refinable place. The operations triggered by the control code can be represented by a refinement network.

Document controlled workflow systems and methods of the present invention can be represented by Petri networks (i.e., Petri nets). A Petri net representation of a document controlled workflow system includes a refinement network that can replace a refinable place. A control code contained in the token itself (i.e., the document) determines the structure of the refinement network that replaces the refinable place. The refinement network refines the target network and uses the resources that the workflow system has available.

The three properties of token cleanup, a reachable output, and a no dead transitions are referred to as soundness properties, which are fundamental to creating a workflow Petri net. If the original Petri net and the refinement network possess these three soundness properties and the refinable place is replaced according to the processes discussed in the present application, refined Petri networks of the present invention also possess these three properties.

DETAILED DESCRIPTION OF THE INVENTION

Figure 1:
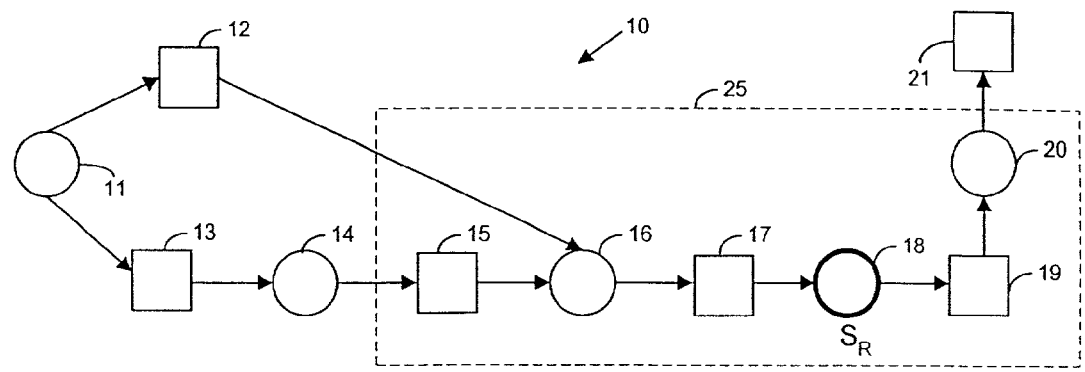
FIGS. 1–3 are illustrations of a Petri network with a refinable place and a refinement network, in accordance with the principles of the present invention.
Figure 2:
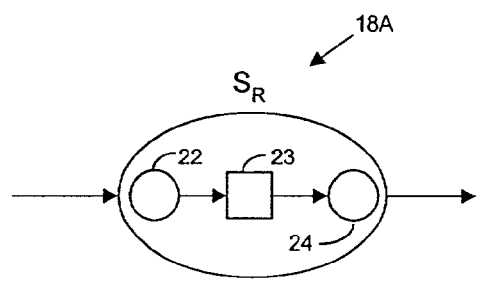
Figure 3:
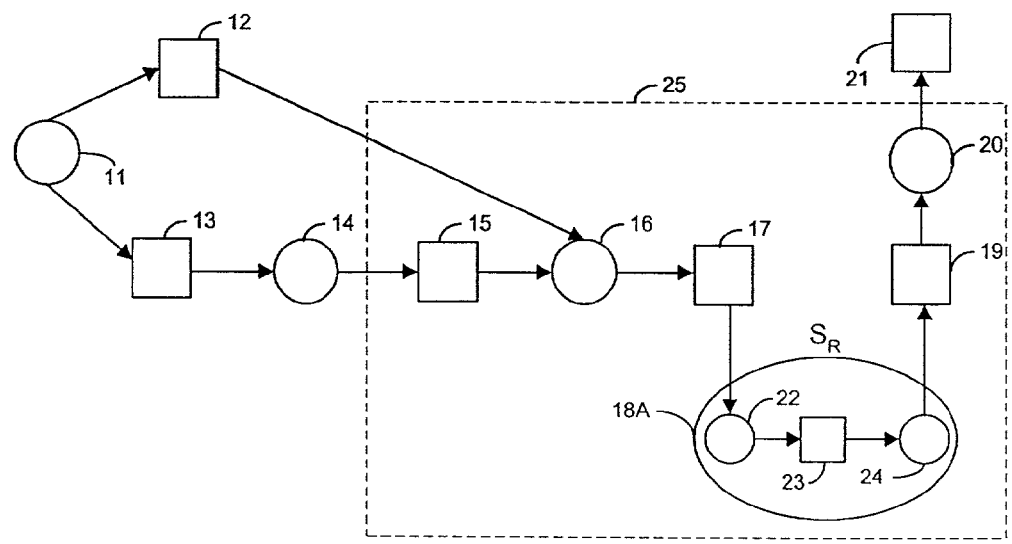

An embodiment of the present invention is shown in FIGS. 1–3. FIG. 1 illustrates a Petri net 10 representation of a document controlled workflow system of the present invention. Petri net 10 includes state nodes 11, 14, 16, 18, and 20, and transition nodes 12, 13, 15, 17, 19, and 21. State node 18 is a novel refinable place that can be replaced by a document controlled refinement network. An example of a refinement network is illustrated in FIGS. 2–3. Petri net 10 as shown in FIG. 1 is also referred to as a target network.

Petri net 10 may represent, for example, a document workflow system for a newspaper publisher, as will now be described in further detail. In this example, all of the transitions and states within region 25 are predefined process steps designed to be performed at the newspaper editorial office. Nodes 11–14 are selected and performed by a reporter, and transition 21 is performed by a typesetter.

A reporter in the field who has prepared an article for publication by the newspaper is ready to submit the article for publication, as indicated by state 11. The reporter may submit the article to the newspaper via facsimile (indicated by transition 13) or via e-mail (indicated by transition 12). If the reporter submits the draft article via facsimile (transition 13), the draft article is available at the newspaper office in faxed form, as indicated by state 14.

At the newspaper office, the document is received and scanned into a scanner to create an electronic version of the draft article (indicated by transition 15). The scanning of the draft article into electronic form may require human intervention. Alternatively, the reporter can fax the article to a facsimile machine that automatically scans documents it receives into an electronic version available for further manipulation (indicated by state 16). If the reporter e-mails the draft article to the newspaper office (transition 12), the document is directly available as an electronic text, as indicated by state 16. The draft article is logged into the newspaper's database, as a submission (transition 17).

Document workflow system 10 then performs tasks that are specified by a control code in the active document. According to principles of the present invention, document workflow system 10 checks the document to determine if it contains a control code indicating that refinable state 18 is to be replaced with a refinement network. If the document does not contain a control code, then the document is electronically passed to an editor who makes corrections to the article (indicated by transition 19), in an example workflow system. The edited article is complete (as indicated by state 20), and the article is passed to the typesetter for printing and publication (indicated by transition 21).

Refinable state 18 can be replaced by a refinement network. Refinable state 18 is built into the document workflow system by a document workflow system designer. The reporter (i.e., the author of the document) can enter a control code into a document that is recognized by document workflow system 10 at refinable state 18. The control code triggers one or more operations (i.e., functions) that can be represented by a refinement network 18A. Refinement network 18A may, for example, represent a process for encrypting a document or translating a document into Japanese. Thus, the control code specifies which operations are performed at a refinable place.

In a Petri net representation of document controlled workflow system, refinable state 18 is replaced by refinement network 18A (shown in FIGS. 2 and 3). The structure of refinement network 18A is determined by the control code in the document. The control code may be, for example, a code in the header or footer of the document, a bar code, or a code anywhere in the document that is recognized by the document workflow system. The control code is distinguishable from content data in the document, such as the text of an article.

Refinement network 18A contains states 22 and 24 as well as transition 23. Refinement network 18A may represent any number of operations (i.e., functions) specified by a control code in a document. The operations are performed automatically or through human intervention on documents passing through the document workflow system.

For example, the document may contain a code that triggers an encryption function in the document workflow system. In this example, refinement network 18A corresponds to an encryption function (represented by transition 23). The encryption function is triggered by a control code in a document that is recognized by the document workflow system. The function of encryption is performed using a predefined encryption protocol (transition 23). Subsequently, the draft article is in an encrypted form (state 24).

As another example, a control code in a document may trigger the document workflow system to implement functions that translate an English document into Japanese. In this instance, refinement network 18A represents steps for translating an English document into Japanese. If the draft article contains a control code that triggers Japanese translation, the draft article is translated into Japanese, as indicated by transition 23. The article is sent to a translator (e.g., a human translator or a software translator) for translation into Japanese. When translation is completed, the draft article includes a Japanese version, as indicated by state 24. The translated article then passed to the editor (transition 19) for further processing according to the document workflow system.

If a document controlled workflow system has resources available to implement a particular operation, it can perform that particular operation. For example, if a control code in a document triggers an encryption function at refinable state 18, a document controlled workflow system can only implement the encryption function if it has encryption software. As another example, if a control code in a document triggers a translation function at refinable state 18, a document controlled workflow system can only implement the translation function if it has translation software or a human translator available. If the encryption or translation functions are not available, the document controlled workflow system cannot implement the unavailable function, despite the presence of a control code in a document indicating the unavailable function should be performed. In that case, the document is merely passed according to the processes of the target document workflow system.

The designer of a document controlled workflow system of the present invention provides an author of a document with the ability to modify the document workflow processes according to specific requirements encoded within the document. Thus, the document controlled workflow techniques of the present invention provide a powerful tool for adding flexibility into a document workflow system so that operations performing in the workflow system can be tailored to each individual document.

The document controlled refinement networks of the present invention may comprise refinable places that comprises initial and final states. The refinement networks have initial and final nodes that are states, not transitions. For example, refinable node 18 in Petri net 10 is a state node, and refinement network 18A has an initial state 22 and a final state 24 that are linked to transitions 17 and 19, respectively. States are refined instead of transitions, because it simplifies formal definitions.

Figure 4A:
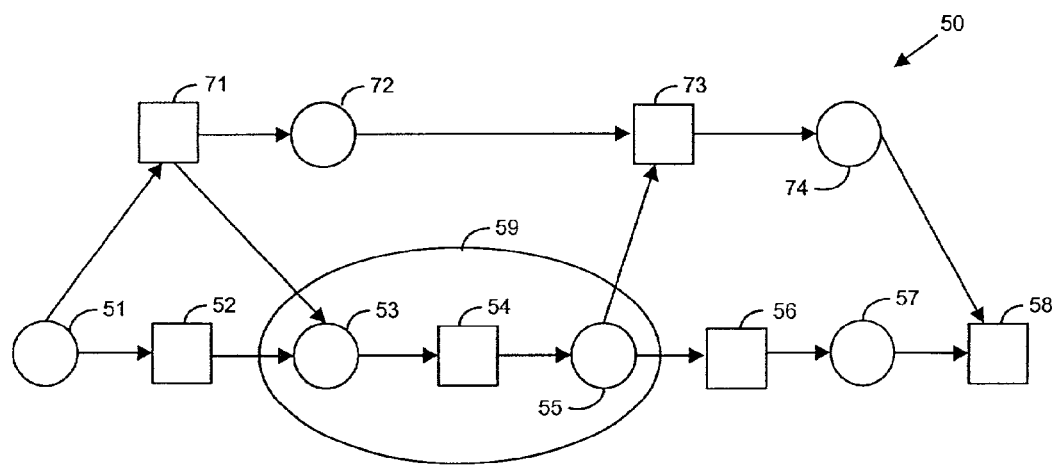
FIGS. 4A–4B are illustrations of a Petri network with a refinable place and a refinement network, in accordance with the principles of the present invention.
Figure 4B:
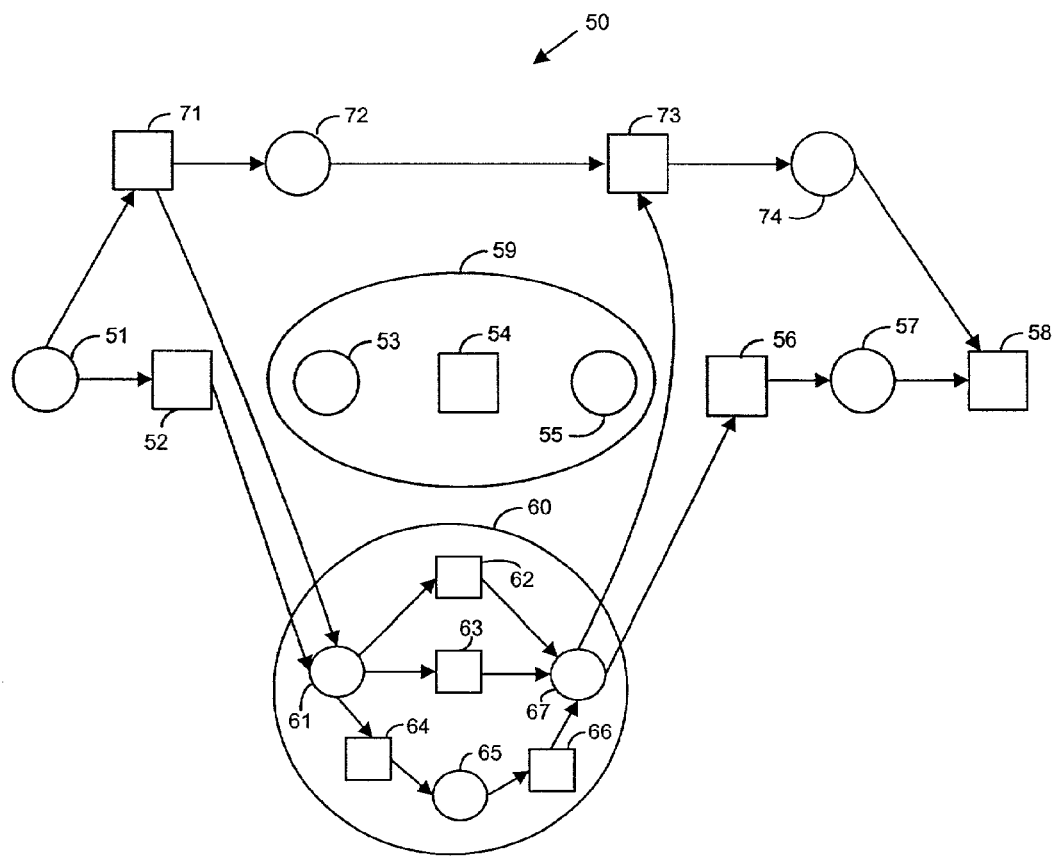

Petri network 50 illustrated in FIGS. 4A–4B is a representation of a document controlled workflow system in accordance with another embodiment of the present invention. Petri network 50 include states 51, 53, 55, 57, 72, and 74 as well as transitions 52, 54, 56, 58, 71, and 73. Nodes 53-55 define a novel refinable place 59 that can be replaced with refinement network 60. Refinable place 59 is an example of a refinable place that comprises a plurality of states and transitions. Refinement network 60 includes states 61, 65, and 67 as well as transitions 62, 63, 64, and 66. Transitions 52, 54, 56, 58, 71, 73, 62-64, and 66 may, for example, represent any suitable software processes. If the document in the workflow system contains a predetermined control code that is recognized by the workflow system, refinement network 60 replaces refinable place 59.

State 61 represents a decision that is made in the workflow process in terms of which of three operations or sets of operations are performed on the document at transitions 62, 63, or 64 and 66. The decision can be made automatically through software processing, for example, based upon the content of the document or other environmental factors. Alternatively, the decision can be based upon human input or intervention. State 67 is the final state of the refinement network, after which an operation in the original target workflow system is performed on the document (indicated by transition 56 or 73).

Operations can be performed on some portions of a document and not on other portions of the document in a document controlled workflow system. For example, a document passing through a document controlled workflow system may contain three chapters. The document may contain a first predetermined control code that triggers the workflow system to translate chapter one into Japanese (indicated by transition 62). The document may also contain a second predetermined control code that concurrently triggers the document workflow system perform a spell checking function only on chapter two (indicated by transition 63). The document may also contain a third predetermined control code that concurrently triggers the workflow system to bold certain words (transition 64) and italicize certain words (transition 66) only in chapter three.

The three soundness properties of 1) token cleanup, 2) a reachable output, and 3) a no dead transitions are fundamental to creating a workflow Petri net. A reachable output in a document workflow Petri net means that there are no conditions internal to the Petri net that could cause a document to get stuck in the Petri net. A document passing through the Petri net should always reaches the output without getting stuck in the Petri net, for example, at an infinite loop or at a dead end node.

The property of no dead transitions means that there are no transitions in the Petri net that can never be fired. Conversely, all transitions can be fired from a reachable state. The property of token cleanup means that once a token (e.g., a document) reaches the output node of the network, the network has no tokens remaining elsewhere in the Petri net. In other words, if a document can reach an output node in the Petri net from the input node, then that output node is the only output node. If a target network and a refinement network are both sound (i.e., they both possess the three soundness properties) and the refinable place is replaced according to the process discussed below with respect to FIG. 5, then the resulting document controlled refined network also possesses the three soundness properties.

Figure 5:
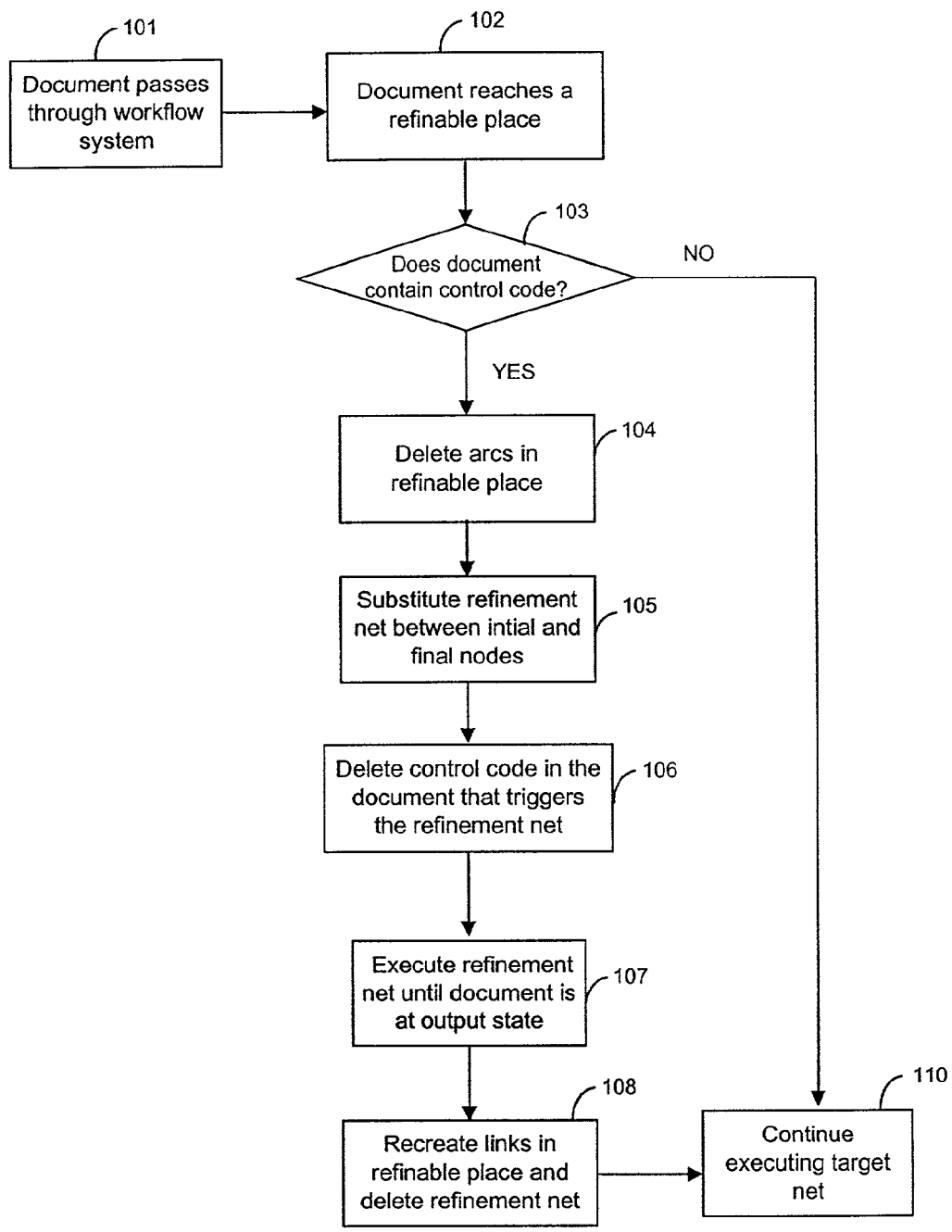
FIG. 5 is a flow chart illustrating process steps of a document controlled workflow system with refinement networks, in accordance with the principles of the present invention.

FIG. 5 is a flow chart illustrating the steps involved in passing a document through a document controlled workflow system of the present invention. A document passes through the document controlled workflow system at step 101, that may, for example, be represented by Petri net 50. At step 102, the document is passed to a refinable place such as refinable place 59. The document controlled workflow system then determines if the document contains a predetermined control code associated with one or more operations. These operations are represented as a refinement network, such as refinement network 60 linked to refinable place 59.

The control code may be, for example, a predetermined set of data in the document, a predetermined image or graphic, or a predetermined string of characters, numbers, and/or symbols. The control code may be located at a predetermined location in the document. The document workflow system scans the document for the predetermined control code. If the predetermined control code is not present anywhere within the document (decision 103), the document workflow system bypasses the refinement network and continues to execute processes represented by the target network at step 110. Alternatively, the document workflow system may bypass the refinement network and continue to execute processes represented by the target network at step 110 if the control code is not found in a predetermined location in the document.

If the document controlled workflow system finds a control code it recognizes in a document (decision 103), the workflow system implements the operations indicated by the control code. The document controlled workflow system should have resources available to implement the operations specified by the control code. The document-specified operations are represented by a refinement network, e.g., network 60. The arcs in the refinable place are deleted at step 104 to prevent the implementation of the refinable place. For example, all the arcs coupled to nodes 53–55 are deleted in target net 50 (including the arcs connecting transitions 52 and 71 with state 53 and the arcs connecting state 55 with transitions 73 and 56) as shown in FIG. 4B so that refinable place 59 is not implemented.

At step 105, the refinement network is substituted between the initial and final nodes in the target network that link to the refinable place. For example, refinement network 60 is substituted between transitions 52, 71, 56, and 73, and arcs are created between transition 52 and state 61, between transition 71 and state 61, between state 67 and transition 56, and between state 67 and transition 73 as shown in FIG. 4B. The normal firing rule of Petri nets, under which transitions change only the distribution of tokens to places, is adapted. In the present invention, a refinable place may be replaced by a refinement network.

The document controlled workflow system then deletes the control code in the document that triggers the refinement network at step 106 so that the control code does not trigger the document system to repeat any of the process steps. The operations represented by the refinement network are then executed until the document is at the output state (e.g., state 67) at step 107. Operations represented by the original target Petri net are then performed on the document. For example, after output state 67, operations represented by transitions 56 or 73 are performed.

After operations represented by the refinement network are performed, the refinement network is deleted, and the arcs reconnecting the refinable place to the rest of the target network are recreated, at step 108. The nodes in the target network are now linked as they were before step 104. The input and output nodes of the refinable place should continue to be marked as such during the refinement process so that the arcs are reconnected to the proper nodes. For example, the links to input state 53 and output state 55 of refinable place 59 shown in FIG. 4A are reconnected at step 108.

Steps 104–108 ensure the proper network is implemented by adding a refinement network only after the connections to the network it is replacing are deleted. The document system then continues executing the processes represented by the target network at step 110. Additional documents that enter the document controlled workflow system are processed according to steps 101–108 and 110, as discussed above.

In another embodiment, a document controlled workflow system of the present invention can include two or more refinable places that can be replaced by operations (represented by refinement networks) triggered by a control code in a document. Document controlled workflow networks of the present invention may be implemented on any suitable hardware embodiment. For example, a document controlled workflow system can be preformed on a personal computer, in a network environment using a plurality of computers connected through a network, on computers or processors connected through the Internet, using computers connected to a server in a client-server arrangement, or any combination thereof.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth. Therefore, many modifications may be made to adapt a particular situation or material to the teachings of the invention without departing from the essential scope and spirit of the present invention. It is intended that the invention not be limited to the particular embodiments disclosed, but that the invention will include all embodiments and equivalents falling within the scope of the claims.

What is claimed is:

1. A method for implementing a document workflow system that can be represented by a Petri net, the method comprising:
   determining if a document contains a control code at a refinable place in the Petri net, the control code including a refinement network;
   replacing the refinable place with the refinement network and processing the document using the refinement network only if the document contains the control code; and
   deleting the refinement network after the document has been processed using the refinement network and recreating the replaced refinable place.

2. The method defined in claim 1 wherein the refinement network comprises one or more transitions and two or more states connected together.

3. The method defined in claim 1 wherein the control code is a first control code, wherein the refinement network is a first refinement network, wherein replacing the refinable place comprises replacing the refinable place with the first refinement network if the document contains a first control code, and replacing the refinable place with a second refinement network if the document contains a second control code, the second control code including the second refinement network.

4. The method defined in claim 3 wherein deleting the refinement network further comprises deleting the first refinement network if the document contained the first control code, or the second refinement network if the document contained the second control code.

5. The method defined in claim 1 further comprising:
   deleting the control code in the document.

6. The method defined in claim 1 wherein replacing the refinable place with the refinement network further comprises deleting arcs in the refinable place.

7. The method defined in claim 6 wherein deleting the refinement network further comprises recreating the deleted arcs in the refinable place after the document has been processed using the refinement network.

8. The method defined in claim 1 further comprising:
   determining if the document contains a second control code at a second refinable place in the Petri net, the second control code including a second refinement network;
   replacing the second refinable place with the second refinement network and processing the document using the second refinement network only if the document contains the second control code; and
   deleting the second refinement network after the document has been processed using the second refinement network.

9. A method for processing a document in a document workflow system that can be represented by a Petri network, the method comprising:
   determining if the document contains a control code when the document reaches a refinable place in the Petri net; and
   if the document contains the control code:
      replacing the refinable place with a refinement network that is included in the control code,
      deleting the control code in the document,
      processing the document using the refinement network,
      deleting the refinement network, and
      recreating the refinable place that was replaced by the refinement network.

10. The method defined in claim 9 further comprising processing the document at a transition connected to the refinable place.

11. The method defined in claim 9 wherein the refinement network comprises a third transition and first and second states.

12. The method defined in claim 9 wherein the control code is a first control code, wherein the refinement network is a first refinement network, wherein replacing the refinable place comprises replacing the refinable place with the first refinement network if the document contains a first control code, and replacing the refinable place with a second refinement network if the document contains a second control code, the second control code including the second refinement network.

13. The method defined in claim 12 wherein deleting the refinement network further comprises deleting the first refinement network if the document contained the first control code, or the second refinement network if the document contained the second control code.

14. The method defined in claim 9 wherein replacing the refinable place with the refinement network further comprises deleting arcs in the refinable place.

15. The method defined in claim 14 wherein deleting the refinement network further comprises reconnecting the deleted arcs in the refinable place.

16. A computer program product embodied on a tangible computer readable storage medium for processing a document in a document workflow system represented by a Petri network, the computer program product comprising:
   code for determining if the document contains a first control code at a first refinable place in the Petri net, the control code including a refinement network;
   code for replacing the first refinable place with the first refinement network if the document contains the first control code;
   code for executing the first refinement network on the document if the document contains the first control code; and
   code for deleting the refinement network and for recreating the replaced refinable place.

17. The computer program product defined in claim 16 further comprising:
   code for continuing to execute the document workflow system on the document if the document does not contain the first control code.

18. The computer program product defined in claim 16 further comprising:
   code for determining if the document contains a second control code at a second refinable place in the Petri net, the second control code including a second refinement network;
   code for replacing the second refinable place with a second refinement network if the document contains the second control code; and
   code for executing the second refinement network on the document if the document contains the second control code.

19. The computer program product defined in claim 16 wherein the first refinement network comprises first and second states and a second transition connected to the first and second states.

20. The computer program product defined in claim 16 wherein:
- the code for determining if the document contains the first control code at the refinable place further comprises code for determining if the document contains a second control code at the first refinable place;
- the code for replacing the first refinable place with the first refinement network if the document contains the first control code further comprises code for replacing the first refinable place with a second refinement network if the document contains a second control code; and
- the code for executing the first refinement network on the document if the document contains the first control code further comprises code for executing the second refinement network on the document if the document contains the second control code.

21. The computer program product defined in claim 16 further comprising code for deleting arcs in the refinable place.

22. The computer program product defined in claim 21 further comprising code for deleting the first control code in the document.

23. The computer program product defined in claim 22 further comprising code for recreating the arcs in the refinable place and code for deleting the refinement network.

24. A system for processing a document in a workflow system represented by a Petri net, the system comprising:
- a first module for determining if the document contains a control code at a refinable place in the Petri network, the control code including a refinement network;
- a second module for replacing the refinable place with a refinement network if the document contains the control code;
- a third module for processing the document using the refinement network if the document contains the control code;
- a fourth module for recreating the arcs in the refinable place and deleting the refinement network after the third module is executed;
- a processor; and
- a memory coupled to the processor, the memory configured to store the first, second, third modules, and fourth modules for execution by the processor.

25. The system defined in claim 24 wherein the second module deletes arcs in the refinable place.

26. The system defined in claim 25 wherein the second module deletes the control code in the document.

* * * * *